United States Patent
Murphy

(10) Patent No.: US 6,417,448 B1
(45) Date of Patent: Jul. 9, 2002

(54) SAFETY SWITCH

(75) Inventor: Patrick J. Murphy, Marcellus, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 09/754,730

(22) Filed: Jan. 4, 2001

(51) Int. Cl.$^7$ .................................................. H05K 5/02
(52) U.S. Cl. ....................... 174/51; 174/6; 174/40 CC; 439/98
(58) Field of Search ................................ 174/51, 35 R, 174/6, 135, 35 C, 40 CC; 439/98, 92, 100; 361/799, 753, 736

(56) References Cited

U.S. PATENT DOCUMENTS

| | | |
|---|---|---|
| 4,316,999 A | 2/1982 | Nattel |
| 4,649,230 A | 3/1987 | Nielsen |
| 5,637,829 A | 6/1997 | Nakamura et al. |
| 5,645,372 A | 7/1997 | Hahn |
| 5,746,610 A * | 5/1998 | Shiu ............................. 439/98 |
| 5,777,263 A * | 7/1998 | Maehler et al. ............... 174/51 |
| 6,103,973 A | 8/2000 | Sharp |
| 6,269,004 B1 * | 7/2001 | Ebert .......................... 361/736 |

* cited by examiner

Primary Examiner—Dean A. Reichard
Assistant Examiner—Dhiru R Patel
(74) Attorney, Agent, or Firm—Wall Marjama & Bilinski LLP

(57) ABSTRACT

A ground plate for an electrical device which includes a substantially flat base section having a pair of support rails positioned substantially perpendicular to the base section with said support rails being formed integral with said base section through cuts through the thickness of said base section at predetermined locations. The cuts are then bent at a right angle to form the rails.

3 Claims, 3 Drawing Sheets

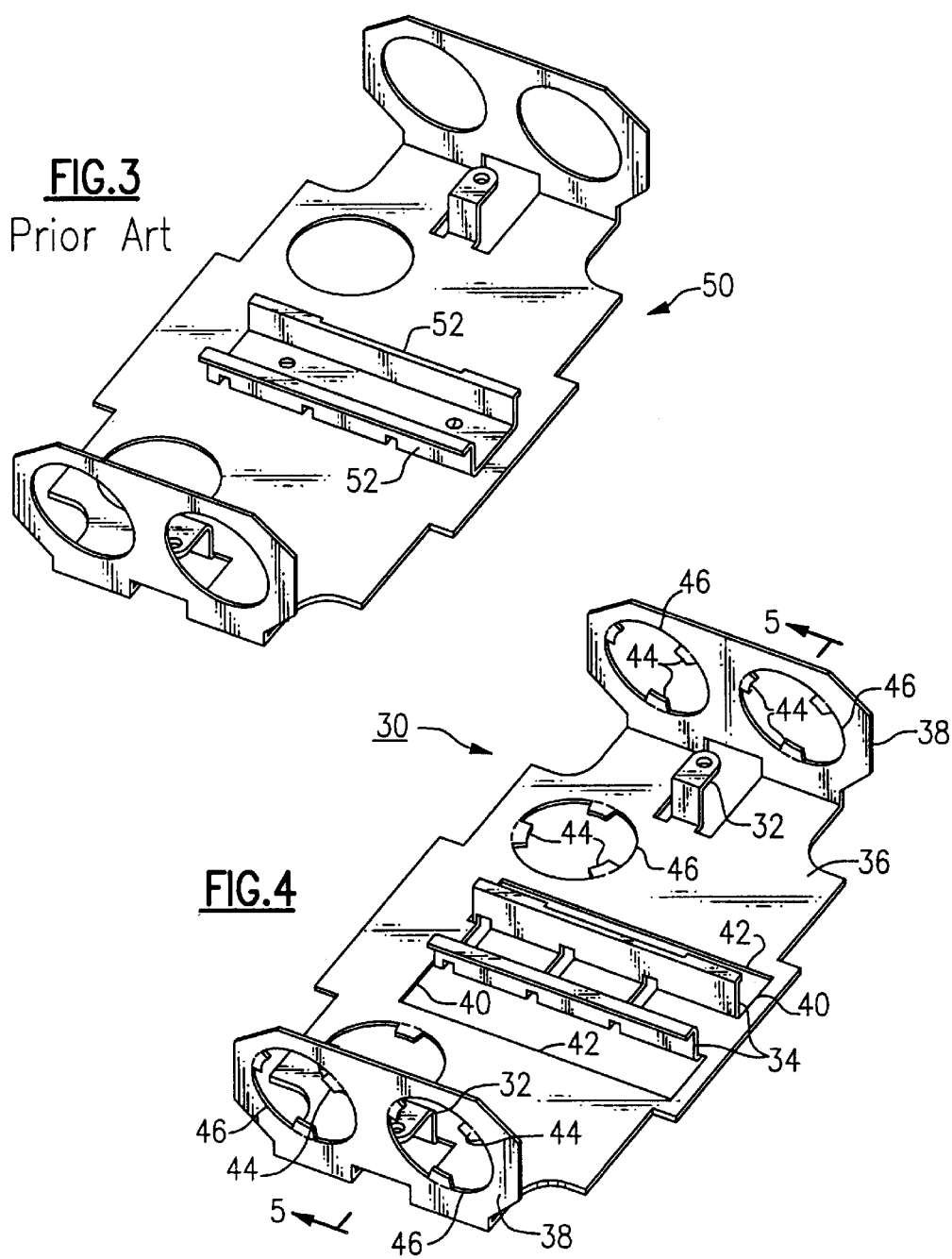
FIG. 3 Prior Art
FIG. 4
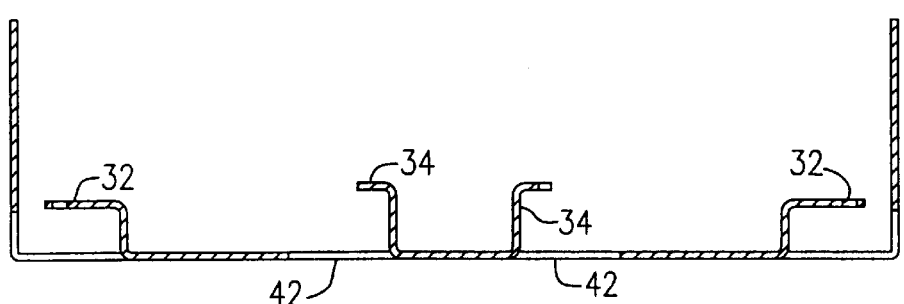
FIG. 5

SAFETY SWITCH

BACKGROUND OF THE INVENTION

The present invention relates to electrical devices and more specifically to switching devices which use a ground plate.

In conventional switching devices of the prior art, a ground plate is used for electrically grounding to provide an intentional path for current to ground. These plates also function to support various electrical components such as the switch and various terminals. These components are usually supported on a pair of rails which are fixed to the bottom of the ground plate. The rails are conventionally mounted on a separate plate which in turn is affixed to the bottom of the ground plate.

The above structure requires a separate rail assembly which is mounted to the bottom of the ground plate by spot welds, screws and the like. This structure requires a separate support rail component and the manufacturing steps associated with the assembling of the switching device. It can be seen that the support rail structure described herein is a separate component which adds to the cost of the switching device through added material costs, and separate manufacturing and assembly steps.

These ground plates also conventionally include a plurality of annular openings which accommodate the entry of suitable electrical cables into the electrical switching device. These openings usually contain an annular concentric knockout section, usually of reduced wall thickness, which allows the annular opening to be enlarged to accommodate a second or larger diameter cable and/or fitting. In removing or punching out the annular knockout, the force required to remove the knockout commonly results in bending the metal area surrounding the annular opening and damaging the integrity of the ground plate.

It can therefore be seen that there is a need for a knockout structure which effectively functions to enlarge the annular cable opening of a ground plate without damaging the integrity and operation of the ground plate.

SUMMARY OF THE INVENTION

It is therefore an objective of the present invention to provide a ground plate which overcomes the problems of the prior art described above.

It is another objective of the present invention to provide a ground plate having an integral support structure which allows for less material and assembly costs.

It is yet another object of the present invention to provide a ground plate for an electrical switching device which contains a support member which is an integral part of the ground plate.

It is a further object of the present invention to provide a ground plate for an electrical device which includes a pair of support members which are integrally formed as part of the ground plate.

The present invention is directed to a ground plate for an electrical device, such as a safety switch or the like, in which a pair of support rails are integrally formed as part of the ground plate.

More specifically the ground plate is in the form of a substantially flat base section which includes a pair of oppositely disposed vertical end members integral with the base section. The ground plate further includes a pair of support rails positioned perpendicular to the base section between said end members. The support rails are formed integrally as part of the base section through cuts through the thickness of said base section at predetermined locations. The cut sections are then bent at a right angle to form the rails.

The ground plate of the present invention is a one piece unitized device which requires less material and less assembly time (cost) than the composite ground plates of the prior art, while being functionally equivalent, and in some cases functionally better than the conventional ground plates described herein.

BRIEF DESCRIPTION OF THE DRAWINGS

For a further understanding of these and other objects of the invention, reference will be made to the following detailed description of the invention which is to be read in connection with the accompanying drawings, wherein:

FIG. 3 is perspective view of a ground plate of the prior art.

FIG. 4 is a perspective view of the ground plate of the present invention.

FIG. 5 is a sectional view of the ground plate of FIG. 4 along line 5—5.

DETAILED DESCRIPTION OF THE INVENTION

Figure 1:
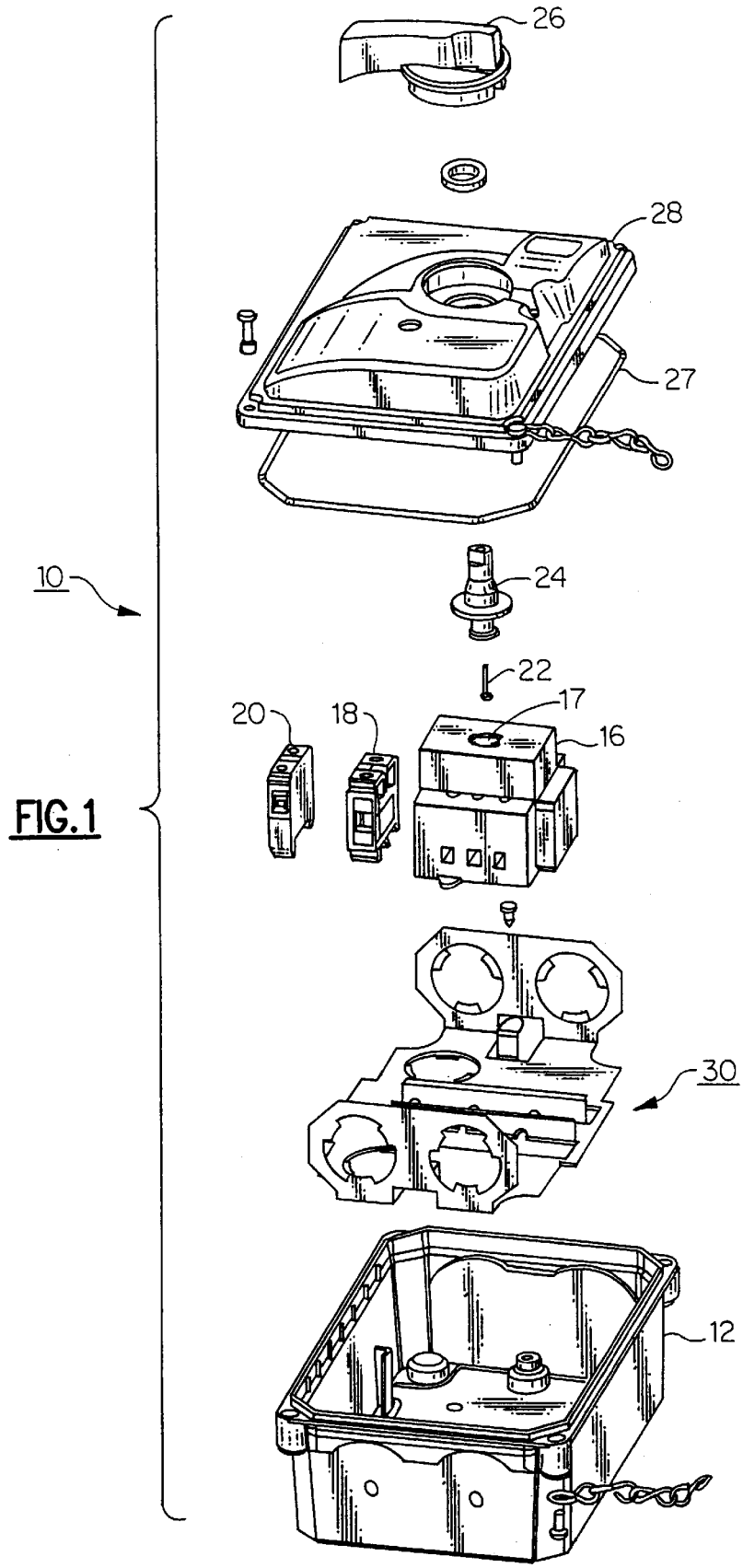
FIG. 1 is an exploded view of a safety switch which includes the ground plate of the present invention.
Figure 2:
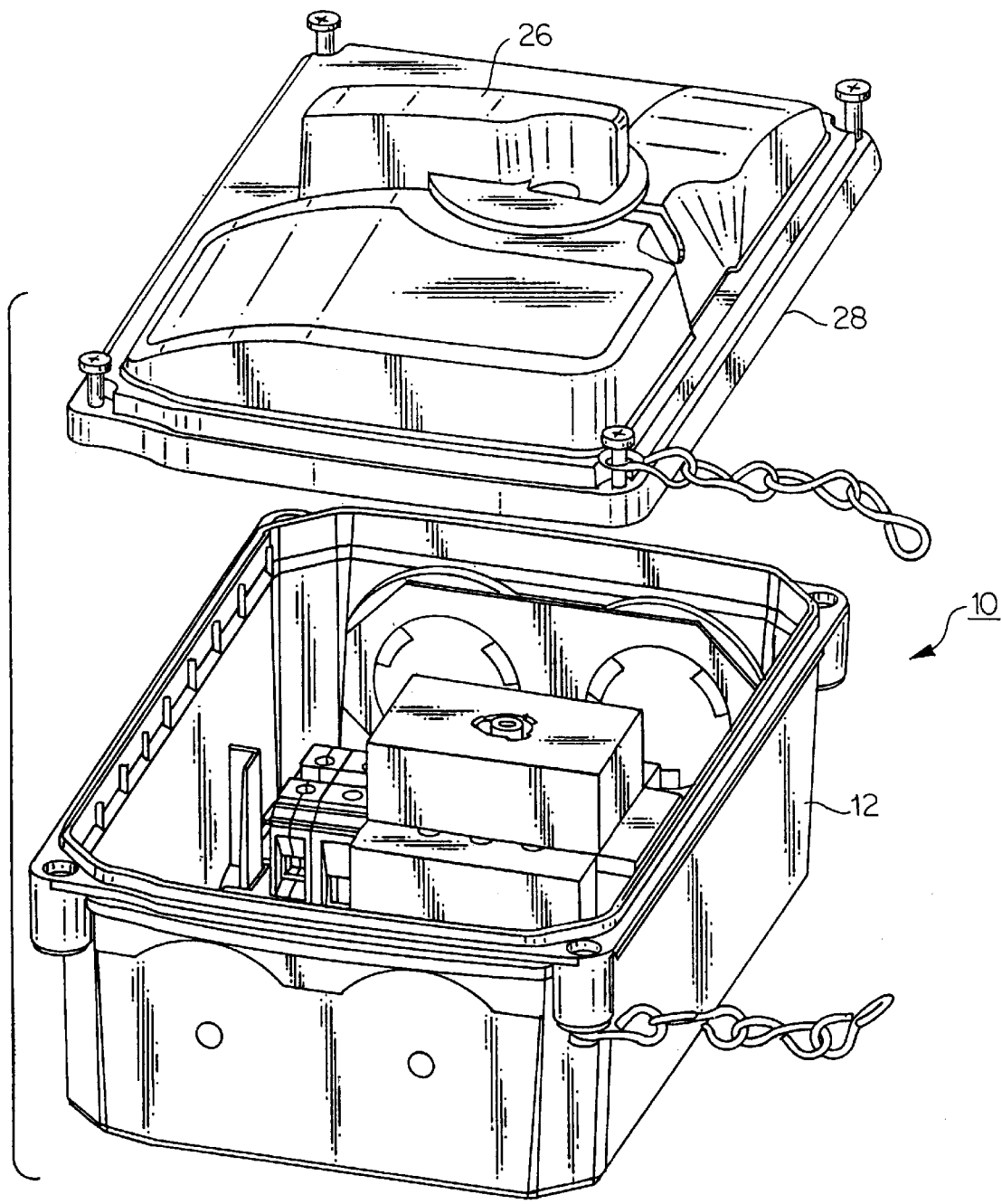
FIG. 2 is a perspective view of the assembled switch of FIG. 1.

FIGS. 1 and 2 illustrate a safety switch 10 which includes the ground plate of the present invention. The switch includes a base 12, a ground plate 30, a switch 16 and terminals 18 and 20. A fastener 22 and key 24 are used to connect switch 16 to handle 26. A cover 28 and O-ring 27 seals the interior of the switch to base 12. Key 24 connects to switch 16 at recess 17 and handle 26 to enable handle to move from an "off" to "on" position to activate the switch.

Ground plate 30 is secured to the bottom of base 12 through screw fixtures 32. Switch 16 and terminals 18 and 20 are mounted on rails 34 by conventional means well known to the art.

FIGS. 4 and 5 illustrates the ground plate 30 of the present invention which includes a base 36, two vertically disposed end sections 38 and two support rails 34 which are positioned in between the end sections. The rails are formed integrally with the base through cuts 40 and 42 through the thickness of the base. The cuts are made by any conventional methods such as stamping, and then bending the cut sections vertically to form the two rails. By forming the rails integral with the base of the ground plate, less material is required, and less assembly time and manufacturing steps than the conventional prior art structures which require a separate rail component to be welded to the base of the ground plate. FIG. 3 illustrates a ground plate of the prior art in which the support rails 52 are spot welded or screwed to the base of the ground plate 50.

As also shown in FIG. 4 the ground plate further includes a plurality of knockout tabs 44 disposed at substantially equal distances along the circumference of the inside diameter of the annular cable openings 46, these tabs have a reduced wall thickness at their base (not shown) to allow the tabs to be easily punched out or bent back and forth to break them off when it is necessary to enlarge the openings to accommodate a larger cable. By using a plurality of individual knockout tabs the annular opening can easily be enlarged to accommodate a larger cable size and/or fitting. As previously discussed herein, the prior art employs a complete annular knockout which when removed by punching or bending often results in bending or damage to the end of the ground plate due to the force required to remove the knockout. The tab structure eliminates the problem of the prior art structure.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. A ground plate for an enclosure housing for an electrical device which comprises:

(a) a substantially flat base section which includes a pair of oppositely disposed vertical end members integral with said base section; with each of said end members including at least one annular opening to accommodate an electrical cable;

(b) a pair of support rails positioned substantially perpendicular to said base section between said end members, said support rails being formed integral with said base section through cuts through the thickness of said base section at predetermined locations, and substantially right angle bends at said cut portions of said base section to form said rails.

2. The plate of claim 1 in which said plate is made of metal.

3. The plate of claim 1 in which an electrical switch is mounted on and supported by said support rails.

* * * * *